United States Patent [19]

Stolte

[11] Patent Number: 4,922,854
[45] Date of Patent: May 8, 1990

[54] DEVICE FOR CLOSING OFF A LIQUID-SUPPLY CHANNEL

[75] Inventor: Friedrich Stolte, Halle, Fed. Rep. of Germany

[73] Assignee: Westfalia Separator AG, Oelde, Fed. Rep. of Germany

[21] Appl. No.: 193,125

[22] Filed: May 5, 1988

Related U.S. Application Data

[63] Continuation of Ser. No. 2,839, Jan. 13, 1987, abandoned.

[30] Foreign Application Priority Data

Jan. 23, 1986 [DE] Fed. Rep. of Germany ....... 3602009

[51] Int. Cl.$^5$ ............................................. A01J 3/00
[52] U.S. Cl. ............................. 119/14.14; 119/14.08
[58] Field of Search ............... 119/14.08, 14.14, 14.15, 119/14.18; 137/554, DIG. 907

[56] References Cited

U.S. PATENT DOCUMENTS

| 2,545,857 | 3/1951 | Perkins et al. | 119/14.08 |
|---|---|---|---|
| 2,549,231 | 4/1951 | Perkins | 119/14.08 |
| 3,741,161 | 6/1973 | Zhuk et al. | 119/14.55 X |
| 3,759,226 | 9/1973 | Rudle et al. | 119/14.55 X |
| 3,811,467 | 5/1974 | Jones | 119/14.44 X |
| 3,859,619 | 1/1975 | Ishihara et al. | 137/554 |
| 3,931,794 | 1/1976 | Chillingworth | 119/14.08 |
| 4,033,295 | 7/1977 | Soderlund | 119/14.08 X |
| 4,108,205 | 8/1978 | Hawley | 137/554 |
| 4,126,103 | 11/1978 | Olander | 119/14.08 |
| 4,212,325 | 7/1980 | Phillips | 119/14.44 X |
| 4,214,553 | 7/1980 | Olander | 119/14.08 |
| 4,366,943 | 1/1983 | Licary | 119/14.18 X |
| 4,605,040 | 8/1986 | Merrmöller | 119/14.44 X |

Primary Examiner—Gene Mancene
Assistant Examiner—R. Thomas
Attorney, Agent, or Firm—Sprung Horn Kramer & Woods

[57] ABSTRACT

A device for closing off a liquid-supply channel with an axially moving diaphragm. One face of the diaphragm demarcates a control space that is located in a lid and that can be connected either to the atmosphere or to a source of vacuum through a control valve. The other face of the diaphragm demarcates a product space that is also vacuumized and that accommodates the liquid-supply channel such that the diaphragm can, in one of its limiting positions, close the opening of the channel. To decrease the level of force required for initiating the action and to make the device less expensive, a signal generator is positioned in the lid of the control space and activates the control valve when the diaphragm approaches the lid, thereby connecting the control space with the atmosphere.

4 Claims, 1 Drawing Sheet

DEVICE FOR CLOSING OFF A LIQUID-SUPPLY CHANNEL

This application is a continuation of application Ser. No. 002,839 filed Jan. 13, 1987, now abandoned.

BACKGROUND OF THE INVENTION

The present invention relates to a device for closing off a liquid-supply channel with an axially moving diaphragm, one face of which demarcates a control space that is located in a lid and that can be connected either to the atmosphere or to a source of vacuum through a control valve and the other face of which demarcates a product space that is also vacuumized and that accommodates the liquid-supply channel, such that the diaphragm can, in one of its limiting positions, close the opening of the channel.

A device of this type is known from GB Patent 2 064 823 and can be employed in milking systems etc. The purpose of the device is to close off the liquid-supply channel in the product space when the pressure therein rises. The diaphragm accordingly activates a piston that is maintained in position by vacuum. Since a specific level of force is necessary to do so, the action cannot be initiated until the pressure in the product space has increased enough to be applied by the diaphragm. The device is relatively expensive to manufacture.

SUMMARY OF THE INVENTION

The object of the present invention is to decrease the level of force required for initiating the action and to make the device less expensive.

This object is attained in accordance with the invention by the improvement wherein a signal generator is positioned in the lid of the control space and activates the control valve when the diaphragm approaches the lid, thereby connecting the control space with the atmosphere.

The signal generator in one practical embodiment of the invention consists of two contacts in the lid and of a contact disk positioned on the diaphragm, whereby the disk establishes an electric connection between the contacts when they come to rest against it.

The signal generator can also consist of an inductive proximity switch that is mounted on the lid and that, as it approaches the diaphragm, responds to the contact disk mounted thereon.

To prevent the signal generator from operating while the teat cup is being secured to the udder, the signal from the signal generator can be suppressed for a prescribed length of time at the beginning of the milking process.

The signal from the signal generator can also be suppressed while the milking machine is being automatically cleaned.

Since the diaphragm does not have to transmit any initiating forces, it will move axially in response to extremely slight variations in the pressure in the product space. The device can accordingly respond very rapidly, when for example, only one of the four teat cups falls off, resulting in only a slight increase in pressure in the product space.

Existing milking systems can be easily and cost-effectively retrofitted because they usually already have a diaphragm and changeover valve for purposes of closing off the liquid-supply channel upon termination of milking by ventilating the control space.

Some preferred embodiments of the invention will now be specified with reference to the attached drawings, wherein

DETAILED DESCRIPTION OF THE PREFERRED EMBODIMENTS

Figure 1:
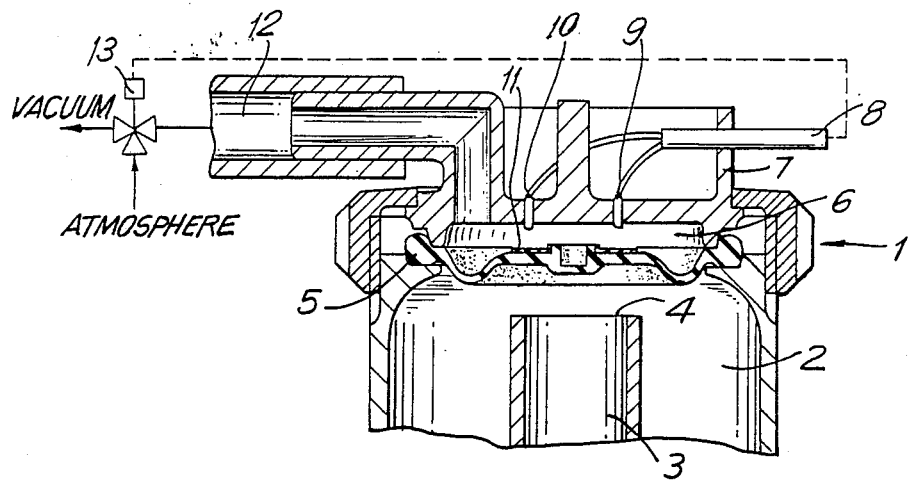
FIG. 1 illustrates the device with the diaphragm in midposition corresponding to teat cups being properly positioned.

The device 1 for closing off a liquid-supply channel illustrated in FIG. 1 can be integrated into known milk-flowmeters in milking systems for example. A product space 2 accommodates a liquid-supply channel 3, which has an opening 4 that can be closed by a diaphragm 5. Diaphragm 5 demarcates a control space 6 in a lid 7. A signal generator 8 and contacts 9 and 10 are mounted on lid 7. Mounted on diaphragm 5 and associated with contacts 9 and 10 is a contact disk 11. Control space 6 communicates with a control valve 13 through a connection 12. Control space 6 can be connected either to the atmosphere or to a source of vacuum by means of a control valve 13.

Figure 2:
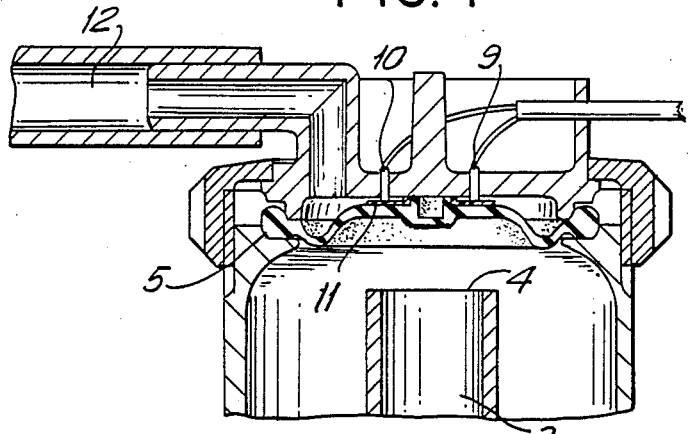
FIG. 2 illustrates the device of FIG. 1 with the diaphragm in one of its limiting positions corresponding to just after one or more of the teat cups have dropped off.

The milking machine is turned on before the teat cups are applied to the udder. Since the teat cups communicate with liquid-supply channel 3, the pressure in product space 2 will be high, and diaphragm 5 will advance toward contacts 9 and 10 and come to rest against them (as shown in FIG. 2). A signal released by the contact disk 11 mounted on diaphragm 5, however, is temporarily suppressed for a prescribed length of time by unillustrated controls in order to give the dairyman time to secure the teat cups without activating control valve 13, which connects control space 6 to the source of vacuum.

Once the teat cups are in place, the vacuum that becomes established in product space 2 will equal the vacuum in control space 6, and diaphragm 5 will shift into the midposition shown in FIG. 1. If one of the teat cups falls off before the end of the milking process, the increasing pressure in product space 2 will force diaphragm 5 against contacts 9 and 10 (as shown in FIG. 2), releasing a signal that activates control valve 13 and connecting control space 6 to the atmosphere. Since the pressure in control space 6 will now be higher than that in product space 2, diaphragm 5 will move into the position illustrated in FIG. 3, closing the opening 4 in liquid passage 3. The communication between product space 2 and the teat cups will now be discontinued and no contaminated air can be suctioned in. The signal will trigger the same process in systems wherein the milking machine is removed automatically.

Figure 3:
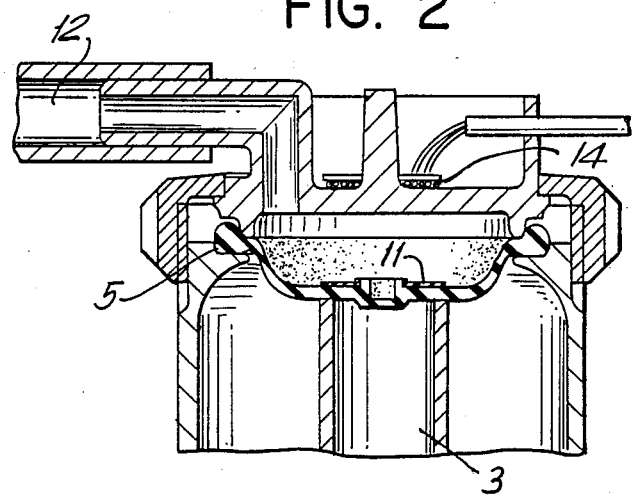
FIG. 3 illustrates the device of FIG. 1 with an alternative sensor and with the diaphragm in its other limiting position and with the control valve switched over.

FIG. 3 illustrates an inductive proximity switch 14 employed instead of contacts 9 and 10.

It will be appreciated that the instant specification and claims are set forth by way of illustration and not limitation, and that various modifications and changes may be made without departing from the spirit and scope of the present invention.

What is claimed is:

1. In a milking system having a liquid supply channel connectable to a vacuum for transporting milk from a cow and a device for closing off the liquid supply channel to prevent the suctioning of air into the liquid supply channel when connected to a vacuum, the device including means forming a product space having a product inlet connected to the liquid supply channel and a control space and including a housing having a cover bounding one side of the control space and having a control inlet and a diaphragm, the improvement comprising: means mounting the diaphragm to separate the product and control spaces in the housing and for movement from a normal midposition wherein the product inlet is open, to a first limiting position away from the product inlet and wherein the product inlet is open and a second limiting position towards the product inlet and wherein the product inlet is closed off thereby; actuatable means for connecting the control space to a vacuum or the atmosphere; switching means responsive to the movement of the diaphragm from the mid-position into the first limiting position as a result of a disconnection of the supply channel from the cow for actuating the actuatable means to connect the control space to the atmosphere to effect the movement of the diaphragm from the first limiting position into the second limiting position wherein the product inlet and therefore the liquid supply channel is closed off and wherein the liquid supply channel is closed off and wherein the diaphragm is disposed in the midposition with the product inlet open and no actuation by the switching means during the transporting of milk from a cow.

2. The device according to claim 1, wherein the switching means comprises signal generating means positioned in the cover for producing a signal in responsive to the movement of the diaphragm into the first limiting position.

3. The device according to claim 2, wherein the signal generating means comprises two contacts in the cover and a contact disk disposed on the diaphragm for electrically connecting the two contacts when the diaphragm is in the first limiting position.

4. The device according to claim 2, wherein the signal generating means comprises an inductive proximity switch mounted on the cover and a contact disk on the diaphragm which is sensed by the switch when the diaphragm is in the first limiting position.

* * * * *